GEORGE W. HARDWICK. Improvement in Mole-Traps.
No. 119,354. Patented Sep. 26, 1871.

Witnesses:
G. Mathys.
Thos. D. D. Durand

Inventor:
George W. Hardwick.
Per [signature]
Attorneys.

UNITED STATES PATENT OFFICE.

GEORGE W. HARDWICK, OF WYANDOTTE, INDIANA.

IMPROVEMENT IN MOLE-TRAPS.

Specification forming part of Letters Patent No. 119,354, dated September 26, 1871.

*To all whom it may concern:*

Be it known that I, GEORGE W. HARDWICK, of Wyandotte, in the county of Tippecanoe and State of Indiana, have invented a new and Improved Mole-Trap; and I do hereby declare the following to be a full, clear, and exact description of the same, reference being had to the accompanying drawing making a part of this specification, in which—

Figure 2:
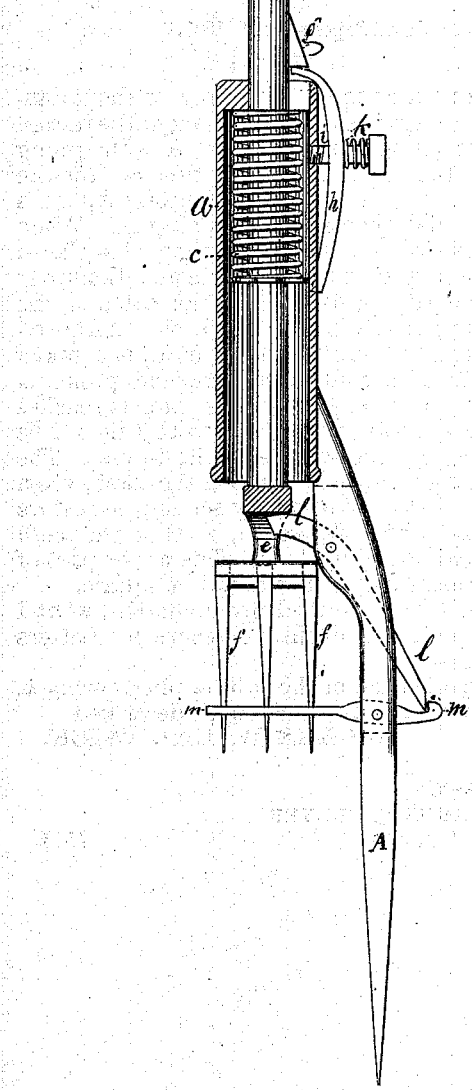
Figure 1:
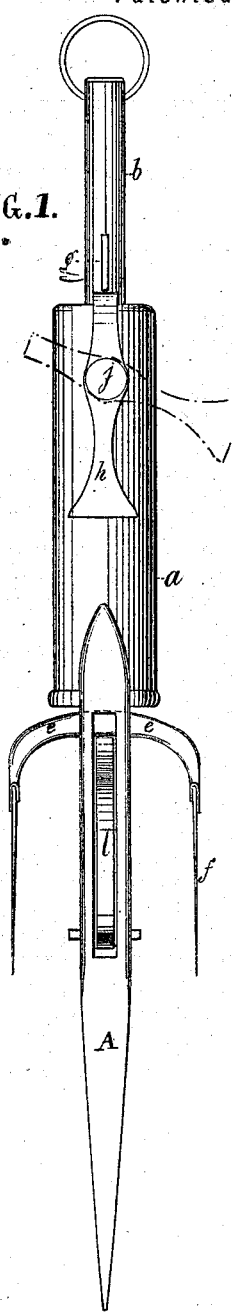

Figure 1 is a side elevation, showing the trap set and the pawl turned down; and Fig. 2 is a sectional elevation, showing the fork-handle raised and held up by the pawl.

My invention consists in the improvement of mole-traps, as hereinafter clearly described and subsequently pointed out in the claim.

Referring to the drawing, $a$ is a tube; $b$, a spindle in the tube $a$; $c$, a spring within the tube $a$, placed between a shoulder at the top of the same, and a projection, $d$, on the spindle. $e$ are forks at the lower end of the spindle, outside the tube. $f$ are prongs attached to the lower extremities of the forks $e$. $g$ is a tooth on the spindle. $h$ is a pawl pivoted to the outside of the tube $a$ by means of a pin, $i$, having a head, $j$, between which head and the pawl around the pin is placed a spring, $k$, to keep the pawl $h$ pressed inward. When the spindle is drawn up high enough the pawl $h$ slips under the tooth $g$ and holds up the spindle and teeth so as to enable the operator to set the trigger without danger, after doing which the pawl $h$ should be turned downward, as shown in Fig. 1. A is the prong affixed to the lower end of the tube $a$. $l$ is the trigger pivoted in a slot in the prong A. $m$ is the catch, also pivoted in the prong A. When the trap is set the head of the trigger $l$ is placed under the bottom of the spindle $a$ and the lower end of the trigger is held by the catch $m$, the latter being in a horizontal position. After setting the trap, when it is to be used, it is taken to the side of a mole-tunnel and the prong A buried in the ground until the catch $m$ reaches the surface of the earth. The teeth $f$ should be directly above the middle of the tunnel. The tunnel being pressed in beneath the catch, when the mole raises the earth by seeking to restore the tunnel it lifts the catch, so that the teeth spring down and impale it. The upper part of the spindle may be either round or square.

Having thus described my invention, what I claim as new, and desire to secure by Letters Patent, is—

The combination of the tube $a$, pin $i$, spring $k$, pawl $h$, spindle $b$, and tooth $g$, as described.

GEORGE W. HARDWICK.

Witnesses:
   PRIMUS P. CULVER,
   M. LUCAS. (51)